United States Patent
Verbeque et al.

(10) Patent No.: US 11,370,547 B2
(45) Date of Patent: Jun. 28, 2022

(54) MOBILE CLASS DIVIDER FOR AIRCRAFT CABIN

(71) Applicant: ZODIAC CABIN INTERIORS EUROPE, Colomiers (FR)

(72) Inventors: Jérôme Verbeque, Colomiers (FR); Romain Breyne, Tournefeuille (FR); Jean-Claude Bourgade, Colomiers (FR)

(73) Assignee: SAFRAN CABIN FRANCE SASU, Colomiers (FR)

( * ) Notice: Subject to any disclaimer, the term of this patent is extended or adjusted under 35 U.S.C. 154(b) by 326 days.

(21) Appl. No.: 15/576,505

(22) PCT Filed: May 27, 2016

(86) PCT No.: PCT/FR2016/051257
§ 371 (c)(1),
(2) Date: Nov. 22, 2017

(87) PCT Pub. No.: WO2016/193585
PCT Pub. Date: Dec. 8, 2016

(65) Prior Publication Data
US 2018/0148172 A1 May 31, 2018

(30) Foreign Application Priority Data

May 29, 2015 (FR) ...................................... 1554872

(51) Int. Cl.
*B64D 11/00* (2006.01)
(52) U.S. Cl.
CPC ........ *B64D 11/0023* (2013.01); *B64D 11/003* (2013.01)
(58) Field of Classification Search
CPC .............. B64D 11/0023; B64D 11/003; D05D 5/0207; D05D 5/043; B64C 1/10
See application file for complete search history.

(56) References Cited

U.S. PATENT DOCUMENTS

| 2,710,731 | A | * | 6/1955 | Bright | ................ | B64D 11/0023 |
| | | | | | | 244/118.6 |
| 4,185,799 | A | * | 1/1980 | Richards, Jr. | ............. | B64C 1/20 |
| | | | | | | 244/118.5 |

(Continued)

FOREIGN PATENT DOCUMENTS

DE    4119623 C1    10/1992

OTHER PUBLICATIONS

International Search Report dated Sep. 14, 2016, issued in corresponding International Application No. PCT/FR2016/051257, filed May 27, 2016, 5 pages.

(Continued)

*Primary Examiner* — Michael H Wang
(74) *Attorney, Agent, or Firm* — Christensen O'Connor Johnson Kindness PLLC

(57) ABSTRACT

A mobile class divider transversely partitions the interior space of a cabin of an aircraft. The divider is delimited by ceiling trim panels, at least two lateral rows of overhead luggage compartments extending longitudinally near to the ceiling trim panels, lateral walls and a floor. The divider slidably mountable to guide rails arranged between the overhead luggage compartments and the ceiling trim panels. The divider includes a transverse main framework extending on either side of the lateral walls, at least two guide blocks supported by the framework, and an adjustment feature. The length of the divider is adjustable to adapt to the distance, in the transverse direction, that separates said guide rails of said cabin.

11 Claims, 4 Drawing Sheets

(56) References Cited

U.S. PATENT DOCUMENTS

Figure 1:
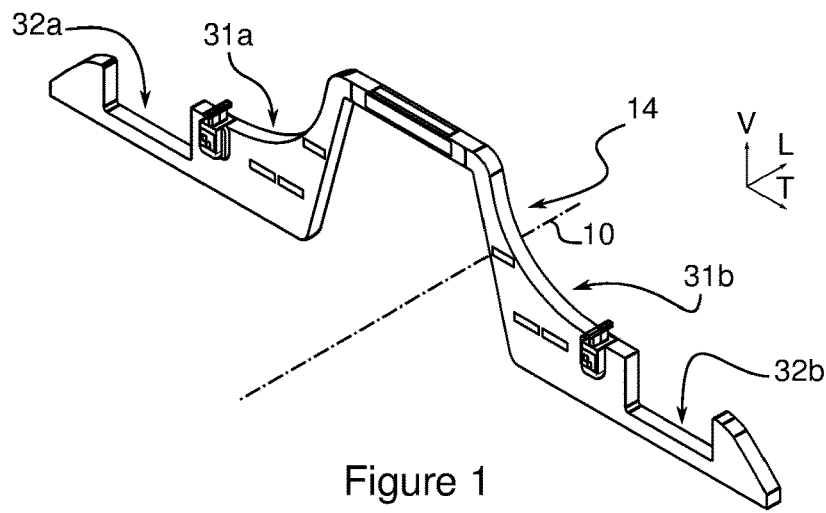

| | | | | |
|---|---|---|---|---|
| 5,238,282 | A * | 8/1993 | Watson | B60H 1/00592 296/24.41 |
| 5,351,441 | A | 10/1994 | Hörmann | |
| 5,816,534 | A * | 10/1998 | Schumacher | B64D 11/0023 244/119 |
| 7,530,529 | B2 * | 5/2009 | Bock | B64D 11/0023 244/118.5 |
| 7,921,512 | B2 * | 4/2011 | Michel | B64D 11/0023 16/102 |
| 9,139,301 | B2 * | 9/2015 | Slyter | B64D 11/0023 |
| 2008/0313964 | A1 * | 12/2008 | Michel | B64D 11/0023 49/409 |
| 2012/0043028 | A1 * | 2/2012 | Roach | B64D 11/0023 160/84.06 |
| 2012/0273613 | A1 * | 11/2012 | Ulbrich-Gasparevic | B64D 11/0023 244/118.1 |
| 2016/0059964 | A1 * | 3/2016 | Breuer | B64D 11/003 244/118.5 |
| 2016/0115721 | A1 * | 4/2016 | Leadens, II | E06B 9/362 244/129.5 |
| 2016/0297525 | A1 * | 10/2016 | Walton | B64D 11/0023 |
| 2017/0129608 | A1 * | 5/2017 | Reams | B64D 11/0624 |

OTHER PUBLICATIONS

Written Opinion dated Sep. 14, 2016, issued in corresponding International Application No. PCT/FR2016/051257, filed May 27, 2016, 6 pages.

International Preliminary Report on Patentability dated Dec. 5, 2017, issued in corresponding International Application No. PCT/FR2016/051257, filed May 27, 2016, 1 page.

* cited by examiner

MOBILE CLASS DIVIDER FOR AIRCRAFT CABIN

1. TECHNICAL FIELD OF THE INVENTION

The invention relates to a mobile class divider intended to be mounted transversely in a cabin of an aircraft extending in a longitudinal direction in order to divide the cabin into two separate spaces. The invention relates to such a divider that is mounted such that it can move in the longitudinal direction to allow an operator to displace the divider in the longitudinal direction of the cabin so as to be capable of modifying the partition created by the mobile class divider when necessary.

2. TECHNOLOGICAL BACKGROUND

The applicant has previously proposed a certain number of mobile class dividers intended to be mounted inside a cabin of an aircraft in order to delimit different spaces within the cabin. Such a divider can, for example, delimit, on either side of the mobile class divider, a "business" class and an "economy" class for which different services and benefits are provided. Moreover, such a divider is mobile, which makes it possible to adapt the space required for each class on each flight. For example, if the flight in question contains few "business" class passengers, the cabin can be rearranged to increase the size of the "economy" class, whereby the mobile class divider is displaced accordingly to delimit the spaces that are thus redefined.

For example, patent applications FR2893003 and FR2893004 filed by the applicant describe dividers for partitioning the interior space of an aircraft cabin, which is delimited by at least the inner surfaces of ceiling trim panels and is equipped with at least two parallel longitudinal rows of overhead luggage compartments arranged near the ceiling trim panels. The divider further comprises at least one transverse partitioning element comprising an upper transverse supporting crosspiece, each free end of which is guided longitudinally by means of an associated guiding structure, which is situated in an intermediate area between the upper part of the luggage compartments of an associated row of luggage compartments and a portion in the vicinity of the ceiling trim panels. Moreover, the guiding structure comprises a slide, the groove of which receives a free end of the crosspiece through longitudinal sliding, and at least one securing lug of the slide, to which lug the slide is secured.

Such a mobile class divider is technically efficient; however, it has the drawback of only being capable of being incorporated into a predetermined configuration of the cabin of an aircraft. In particular, if the cabin's configuration is modified, for example when an aircraft is bought by a third-party airline, the dimensions of the new cabin are not necessarily compatible with the mobile class divider. Indeed, the mobile class divider is configured for a predetermined cabin width and any modification to the internal width of the cabin, for example as a result of a modification to the trim panels, makes the mobile class dividers previously used with the former cabin configuration incompatible. The mobile class dividers must therefore be replaced by new dividers configured to the new cabin.

Similarly, a mobile class divider according to the prior art is configured to adapt to a specific type of aircraft and cannot be easily incorporated into other types of aircraft, in particular aircraft with cabins having different internal widths.

Finally, a mobile class divider according to the prior art can only be used in rectilinear parts of the aircraft portion. It cannot be implemented in non-rectilinear parts of the cabin, such as the conical front portion of the cabin in some aircraft, for example the Boeing 737. This conical front portion of an aircraft has the special feature of having a width that becomes narrower from a predetermined point of the aircraft as far as the front of the aircraft. Therefore, a conventional mobile class divider cannot be installed in this conical portion of the aircraft. Indeed, conventional class dividers are intended to equip the cylindrical portions of aircraft of which the width is constant over the length of the portion.

3. PURPOSES OF THE INVENTION

The purpose of the invention is to overcome at least some of the drawbacks of known class dividers.

In particular, the invention also aims to provide, in at least one embodiment thereof, a mobile class divider that can be incorporated into different aircraft cabin configurations, in particular into configurations having different internal widths.

Another purpose of the invention is to provide, in at least one embodiment, a mobile class divider that can be incorporated into different types of aircraft.

Another purpose of the invention is to provide, in at least one embodiment, a mobile class divider that can be incorporated into a cabin of which the width is not uniform in the longitudinal direction of the aircraft.

Another purpose of the invention is to provide, in at least one embodiment, a mobile class divider that can be used in the conical portions of an aircraft.

Another purpose of the invention is to provide, in at least one embodiment, a mobile class divider that is configured such that it can be mounted in a Boeing 737-type commercial aircraft.

Another purpose of the invention is to provide, in at least one embodiment thereof, a mobile class divider that can be easily maneuvered by an operator.

4. DESCRIPTION OF THE INVENTION

For this purpose, the invention relates to a mobile class divider for transversely partitioning the interior space of a cabin of an aircraft that extends in a longitudinal direction and is delimited by ceiling trim panels, at least two lateral rows of overhead luggage compartments extending longitudinally near to the ceiling trim panels, the lateral walls and a floor, said divider being intended to be mounted so as to slide along guide rails supported by the overhead luggage compartments, said divider comprising:

- a transverse main framework extending, once the mobile class divider has been mounted inside the cabin, on either side of the lateral walls of said cabin beneath said overhead luggage compartments and said ceiling trim panels,
- at least two guide blocks supported by said framework, each guide block supporting sliding runners shaped to fit the guide rails so as to allow, once the mobile class divider has been mounted inside said cabin, said divider to slide along the guide rails of said cabin.

A mobile class divider according to the invention is characterised in that said main framework comprises means for adjusting the length thereof so as to be able to adapt the length of said divider to the distance, in the transverse direction, that separates said guide rails of said cabin.

A mobile class divider according to the invention is distinctive owing to the presence of a main framework equipped with means for adjusting the length thereof. It is therefore possible to adapt the length of the main framework to the distance that separates the guide rails supported by the overhead luggage compartments. A mobile class divider according to the invention can thus be mounted within different configurations of the cabin and can in particular equip cabins that comprise rows of overhead luggage compartments of various shapes and/or dimensions. Moreover, a mobile class divider according to the invention can equip cabins with different internal widths. A mobile class divider according to the invention can therefore be used with different aircraft, without the cabin width and/or the installation therein of a specific type of overhead luggage compartment being criteria determining the choice of mobile class divider. With the invention, the length of the main framework can be adapted to the distance that separates the two guide rails supported by the overhead luggage compartments.

Advantageously and according to the invention, said main framework comprises at least one connecting shell and two lateral wings, each of which is secured to a lateral guide block, each of said wings being mounted such that they slide in said shell so as to be able to slide spontaneously in relation to each other in the transverse direction such that the overall length of said main framework can be adapted to the distance, in the transverse direction, that separates said guide rails, the shell and said lateral wings forming said adjustment means.

According to this variant, the adjustment of the length of the main framework adapts in a spontaneous and synchronous manner to the distance that separates the guide rails. Said spontaneous and synchronous adjustment is a result of the spontaneous sliding of the lateral wings in relation to each other. In particular, each lateral wing is connected to the guide rail via a guide block. The connection between the guide block and the guide rail is such that the guide block can slide along the rail, but cannot be transversely displaced relative to the rail. Furthermore, each lateral wing is connected by sliding to the connecting shell. Moreover, any change in direction of the guide rail that results in the guide rails being moved apart from each other (for example caused by a change in the conic angle of the cabin) causes each lateral wing to slide in the guide block. The length of the main framework therefore adapts in a spontaneous and synchronous manner to the distance, in the transverse direction, that separates the guide rails, and therefore to any change in the conic angle of the cabin.

Advantageously and according to the invention, the connecting shell comprises a pinion and each lateral wing comprises a rack in contact with said pinion, said racks being arranged such that they are facing each other and are diametrically opposed relative to the pinion.

According to this variant, the sliding of the lateral wings in relation to each other is the result of a displacement of the racks supported by the lateral wings relative to a pinion supported by the connecting shell. According to one advantageous variant, the pinion has a vertical axis of symmetry such that the meshing plane of a rack with the pinion is vertical.

Advantageously and according to the invention, said connecting shell is the central part of said main framework and extends in the vicinity of the ceiling of said cabin, once the mobile class divider has been mounted inside said cabin.

According to this variant, the connecting shell is the central part of the main framework. Preferably, the framework further has a longitudinal axis of symmetry such that the connecting shell is centred about the plane of symmetry.

According to this variant, any sliding of the lateral wings in relation to each other resulting from a displacement of the divider along the cabin is symmetrical. In other words, a displacement of the divider along the cabin, and in the event of a change in the conic angle of the cabin, results in a concurrent and synchronous sliding of each lateral wing in the connecting shell, and the connecting shell remains centred about the longitudinal axis of symmetry.

Advantageously and according to the invention, the connecting shell bears a sign signalling an emergency exit of the cabin.

According to this advantageous variant, the connecting shell centred about the longitudinal axis of symmetry bears a sign signalling an emergency exit. Therefore, regardless of the distance between the lateral wings, the sign remains centred about the axis of symmetry of the divider, which is compliant with aviation regulations.

Advantageously and according to the invention, for each guide block, the sliding runners are mounted such that they pivot relative to said main framework in order to be able to be oriented in the direction of the rails, during the displacement of the divider in the longitudinal direction.

According to this variant, the divider can easily adapt to any change in the conic angle of the cabin which results in a change in direction of the guide rails. The pivoting of the sliding runners relative to the main framework aligns the axis of the sliding runners with the axis of the guide rails, regardless of the direction of the guide rails.

Advantageously and according to the invention, the runners comprise an upstream assembly and a downstream assembly, each of which is mounted such that it pivots relative to said main framework such that the upstream and downstream assemblies can be off-centre from each other in order to be able to cover areas in which the direction of the rails changes (as a result of a change in the conic angle of the cabin).

This variant allows the invention to easily cover areas in which the conic angle of the cabin changes. Indeed, the upstream assembly and the downstream assembly can each have a different orientation such that during changes to the conic angle of the rails, the upstream assembly can have a first orientation corresponding to a first direction of the rails and the downstream assembly can have a second orientation corresponding to a second direction of the rails, the first and second directions of the rails defining the change in the conic angle of the cabin.

Advantageously and according to the invention, at least one guide block comprises at least one locking pin controlled by a locking handle between a locked position in which it protrudes from the guide block so as to be housed in a locking insert formed in the guide rail opposite said guide block, and an unlocked position in which it is retracted into said guide block and released from said locking insert in order to allow the displacement of the divider along the guide rails.

According to this variant, the mobile class divider comprises locking means formed by a locking pin mounted on the guide block and shaped according to locking inserts formed in the guide rail. Preferably, each guide rail comprises a plurality of locking inserts evenly distributed along the guide rail so as to form a plurality of locked positions. Moreover, an operator can actuate the locking handle in order to place the locking pin in the unlocked position, allowing the operator to displace the mobile class divider along the guide rails to the desired position. The operator can then actuate the locking handle in order to displace the pin towards the locked position. In practice, the operator must slightly displace the mobile class divider so that the locking pin is housed within the nearest locking insert and is in said locked position. Said locking pin is, for example, mounted on a spring that pushes the locking pin against the core of the rail until it comes into contact with a locking insert into which it can protrude in order to prevent the displacement of the mobile class divider.

The invention further relates to an aircraft equipped with at least one mobile class divider according to the invention.

The invention further relates to a mobile class divider jointly characterised in combination by all or some of the features disclosed hereinabove or hereinbelow.

5. LIST OF FIGURES

Figure 2:
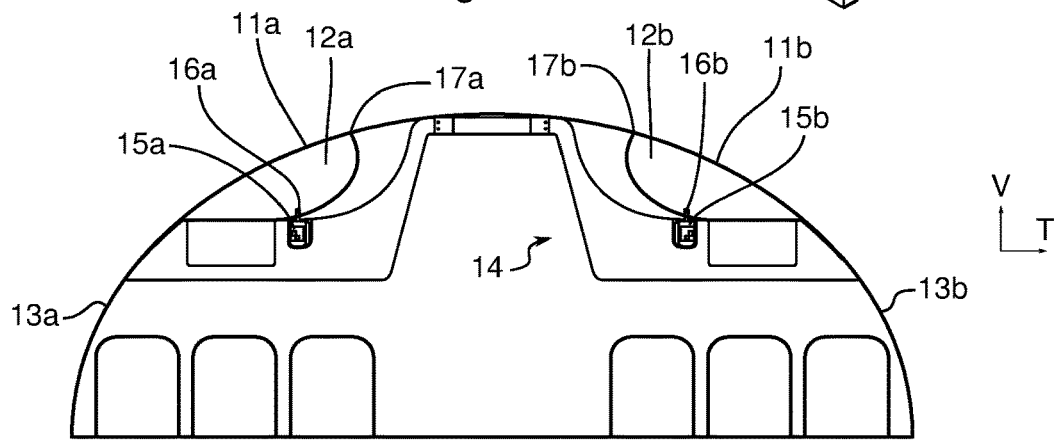
Figure 3:
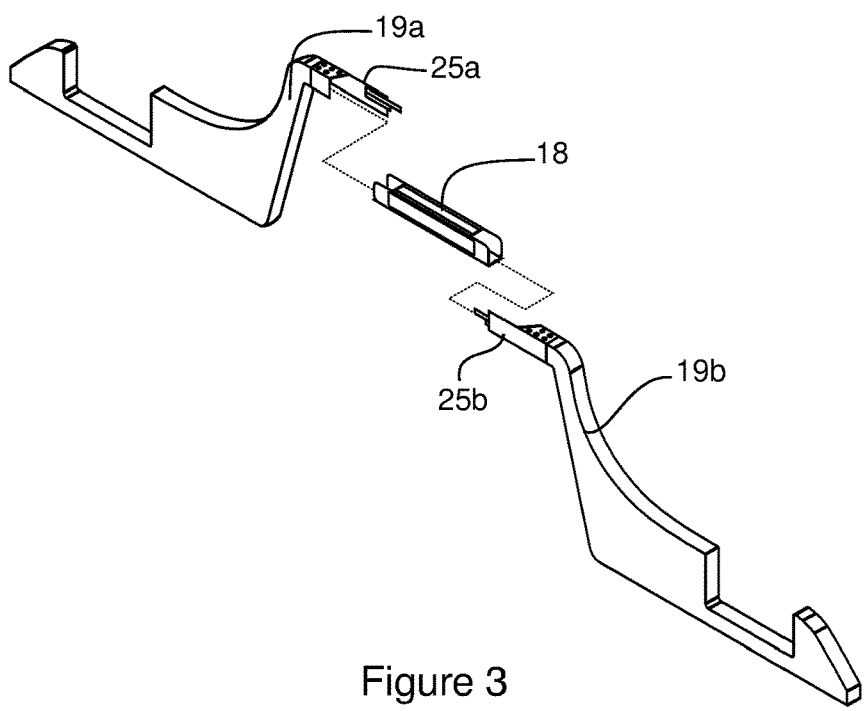
Figure 4:
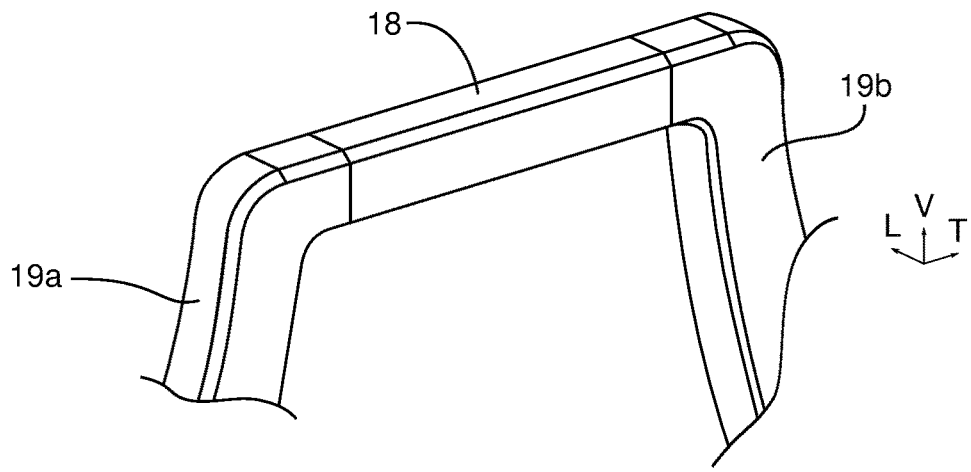
Figure 5:
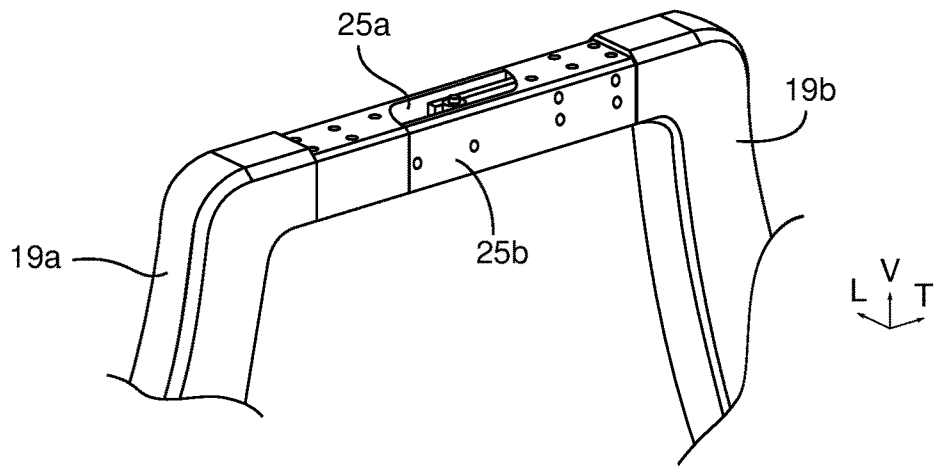
Figure 6:
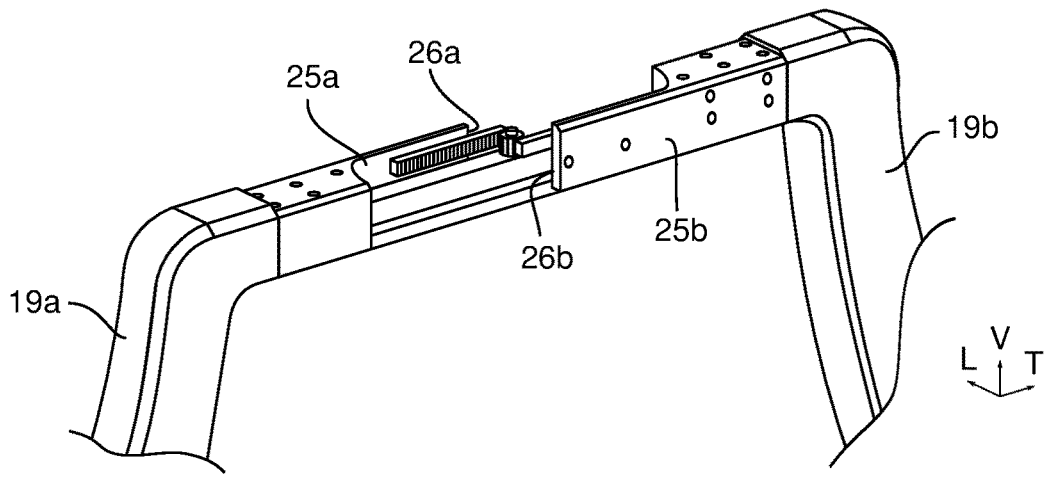
Figure 7:
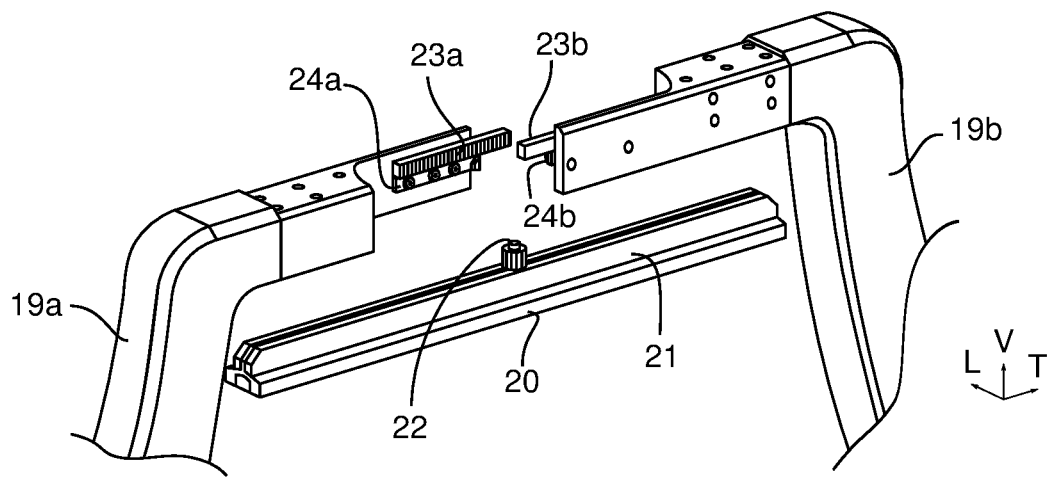
Figure 8:
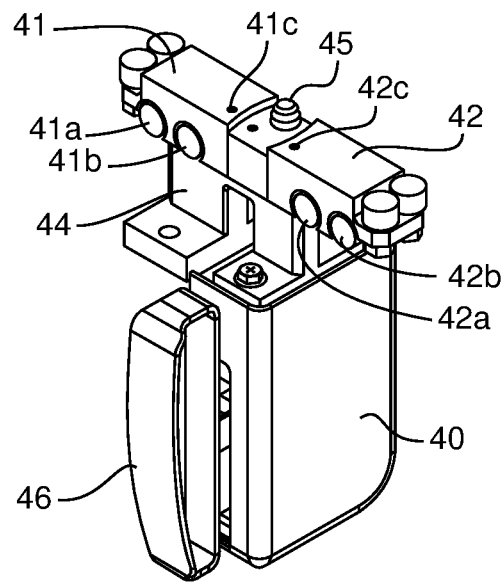

Other purposes, features and advantages of the invention will be better understood upon reading the following description, which is not intended to limit invention and makes reference to the accompanying drawings, in which:

FIG. 1 is a schematic perspective view of a mobile class divider according to one embodiment of the invention, FIG. 2 is a schematic partial view of an aircraft cabin into which the mobile class divider in FIG. 1 is incorporated, FIG. 3 is a schematic partially exploded perspective view of the mobile class divider in FIG. 1, in which the guide blocks are not shown for clarity purposes, FIG. 4 is a schematic perspective view of the central part of a mobile class divider according to one embodiment of the invention, in which the lateral wings are retracted into the connecting shell, FIG. 5 is a view of the divider in FIG. 4 in which the connecting shell is not shown and in which the lateral wings are in a retracted position, FIG. 6 is a view of the divider in FIG. 4 in which the connecting shell is not shown, and in which the lateral wings are in a deployed position, FIG. 7 is a schematic partially exploded perspective view of the central part of a mobile class divider according to one embodiment of the invention, in which the connecting shell is not shown, FIG. 8 is a schematic perspective view of a guide block of a mobile class divider according to one embodiment of the invention, FIGS. 9a, 9b, 9c, 9d, 9e and 9f are schematic sectional views of the sliding of a guide block of a mobile class divider according to one embodiment of the invention in guide rails in the region of a change in the conic angle of the cabin.

6. DETAILED DESCRIPTION OF ONE EMBODIMENT OF THE INVENTION

For illustration and clarity purposes, the scales and proportions are not strictly respected in the drawings. Throughout the following detailed description provided with reference to the drawings, unless otherwise specified, each element of the mobile class divider is described as arranged when the mobile class divider is mounted in an aircraft cabin. This arrangement is in particular shown in FIG. 2. Moreover, identical, similar or analogous elements are designated by the same reference numerals. Finally, the terms longitudinal, transverse and vertical are used in a non-limiting manner with reference to the L, T, V trihedron as shown in the drawings. The longitudinal direction corresponds to the main direction of the aircraft cabin.

As shown in FIG. 2, an aircraft cabin is typically delimited by ceiling trim panels 11a, 11b that extend transversely over the entire width of the upper part of the cabin. The cabin further comprises lateral rows of overhead luggage compartments 12a, 12b fitted beneath the trim panels 11a, 11b. In a known manner, the luggage compartments 12a, 12b are positioned throughout the length of the cabin, above the seats. The cabin further comprises lateral walls 13a, 13b in which windows are generally installed. Finally, the cabin comprises a floor on which the passenger seats are arranged.

Moreover, guide rails 16a, 16b are supported by the overhead luggage compartments 12a, 12b. According to the embodiment in the drawings, the rails 16a, 16b are supported by a lower portion of the overhead luggage compartments 12a, 12b. In other embodiments not shown in the drawings, the rails can be supported by an upper portion of the overhead luggage compartments, or directly by the ceiling trim panels.

A mobile class divider according to the invention is used to transversely partition the interior space of the cabin.

The divider comprises a transverse main framework 14 that extends, once the mobile class divider has been mounted in the cabin, along either side of the lateral walls 13a, 13b of said cabin beneath the overhead luggage compartments 12a, 12b. This main framework 14 is shaped to fit the luggage compartments and the lateral walls, while allowing the overhead luggage compartments 12a, 12b to be opened. Each luggage compartment opens upwards in order to make it easier for passengers to access the luggage compartments. Each luggage compartment therefore has a door that is mounted such that it is articulated relative to the trim panels about an axis of rotation. This axis of rotation is shown by the reference numerals 17a, 17b in FIG. 2. The shape of the framework is determined so as to allow each door of each luggage compartment to pivot relative to said axis of rotation.

For this purpose, the framework comprises, for each row of luggage compartments 12a, 12b, a cut-out area 31a, 31b that is shaped to fit the shape of the cross-section of the overhead luggage compartments and allows the overhead luggage compartments to open. Furthermore, the framework comprises, for each row of luggage compartments 12a, 12b, a cut-out area 32a, 32b shaped to fit and work together with the shape of modules supported by the luggage compartments. These modules typically comprise reading lights for each passenger and oxygen-mask stowage compartments.

According to the embodiment in the drawings, the divider further comprises two guide blocks 15a, 15b supported by the framework 14 opposite the guide rails 16a, 16b. Each guide block is arranged on the main framework 14 such that an area cut-out from the luggage compartments is arranged between a free end of the framework and said guide block. Said guide blocks 15a, 15b are configured so as to be capable of sliding in guide rails 16a, 16b supported by the overhead luggage compartments 12a, 12b. The sliding of the mobile class divider along the guide rails allows the mobile class divider to be displaced along the length of the cabin to position it at an area delimiting a change in classes within the cabin.

The divider according to the invention further comprises means for adjusting the length of the main framework 14. These adjustment means are formed, according to the embodiment in the drawings, and as shown in particular in FIG. 3, by a connecting shell 18 and two lateral wings 19a, 19b which are each secured to a lateral guide block 15a, 15b. The wings 19a, 19b are mounted such that they slide in the connecting shell 18 so as to be capable of moving from a retracted position in which each wing is abutted against a bearing surface of the opposite lateral wing into a deployed position in which each wing is moved apart from the opposite wing. FIG. 5 shows the lateral wings 19a, 19b in the retracted position and FIG. 6 shows the lateral wings 19a, 19b in the deployed position. In FIGS. 5 and 6, only the parts of the lateral wings 19a, 19b in the vicinity of the central part of the cabin are shown. The end parts, comprising in particular the guide blocks, are not shown in these drawings for clarity purposes. Moreover, the upper part of the connecting shell 18 is not shown in these drawings, also for clarity purposes. This shell 18 covers the ends of the lateral wings and is shown in FIG. 4 with the lateral wings in the retracted position. The connecting shell 18 acts both as a cover concealing the ends of the lateral wings and as a connecting member between the lateral wings.

Each of the lateral wings 19a, 19b has, at the end thereof in the vicinity of the connecting block, an extension 25a, 25b which extends, when the wings are in the retracted position, opposite the extension of the opposite wing. Each extension further has an end 26a, 26b which forms an abutment surface against the opposite wing in the retracted position.

The connecting shell 18 comprises, as shown in FIG. 7, a base 20, which supports a strip 21 on which a pinion 22 is mounted so as to pivot about a vertical shaft. The shaft of the pinion 22 extends vertically such that the pinion 22 can turn about itself in a horizontal plane. The pinion 22 comprises teeth working with the teeth of racks 23a, 23b respectively supported by each lateral wing. The racks extend in the transverse direction and are oriented such that their teeth are opposite the teeth of the rack of the opposite wing. They are in contact with the pinion 22 in a diametrically opposed manner. Each lateral wing is also equipped with carriages 24a, 24b configured to roll on the lateral parts of the base 20. Therefore, the lateral wings 19a, 19b can move away from each other. This displacement is the result, for example, of a change in direction of the guide rails. More specifically, the lateral wings are fixed, at the end thereof that faces the guide rails, by the guide blocks 15a, 15b. Said guide blocks 15a, 15b are mounted such that they slide in the guide rails 16a, 16b such that the guide blocks secured to the wings follow the direction of the guide rails 16a, 16b of the cabin. A change in the conic angle of the cabin therefore results in the guide rails 16a, 16b moving further away from or closer to each other. This movement of the rails further away from or closer to each other automatically causes the lateral wings to slide in relation to each other, said sliding mechanically taking place by the displacement of the racks 23a, 23b in the pinion 22.

A divider according to the invention can therefore automatically adapt the length thereof to the distance separating the guide rails in the transverse direction.

Moreover, during the displacement of the lateral wings in relation to each other, the connecting shell 18 remains in position relative to the cabin. The lateral wings slide in relation to each other in the connecting shell 18 in a synchronous manner, without generating any movement of the connecting shell 18. This allows signs, for example for signalling an emergency exit route, to be positioned on the connecting shell 18 while ensuring that said signs remain in a position that is visible to the passengers, regardless of the lateral wings being moved apart from one another.

Moreover, the connecting shell 18 can support a curtain rail secured to the lower surface thereof. A curtain can be mounted onto said curtain rail in order to properly partition the space between the different classes delimited by the mobile class divider. Each lateral wing further comprises a cavity (not shown in the drawings) in which a lateral end of the curtain rail can be housed when the lateral wings are moved closer to each other.

The guide blocks 15a, 15 will now be described with reference to FIG. 8. Such a guide block comprises, according to the embodiment in the drawings, an upstream assembly 41 and a downstream assembly 42. The terms upstream and downstream are used with regard to the orientation of the cabin of the aircraft. The upstream assembly 41 comprises sliding runners 41a, 41b and the downstream assembly 42 comprising sliding runners 42a, 42b.

Each assembly is mounted such that it pivots relative to a body 40 of the guide block. The body 40 is secured to the main framework 14 such that each assembly pivots relative to the main framework 14. According to the embodiment in the drawings, the body 40 and each assembly are secured to each other via a bracket 44 screwed onto the body 40.

The upstream assembly 41 is mounted such that it pivots about a vertical pin 41c and the assembly 42 is mounted such that it pivots about a vertical pin 42c. The upstream and downstream assemblies are oriented, when at rest, in the longitudinal direction so as to be capable of sliding in the guide rails. Installation by pivoting each assembly relative to the main framework 14 allows each assembly to be off-centre from the longitudinal direction in the event of a change in direction of the guide rails.

FIGS. 9a to 9f show this capacity of the upstream 41 and downstream 42 assemblies to be able to adapt the orientation thereof to the direction of the guide rails 16b1, 16b2, thus allowing the divider according to this embodiment to cover the areas in which the conic angle of the cabin of an aircraft changes.

Figure 9A:
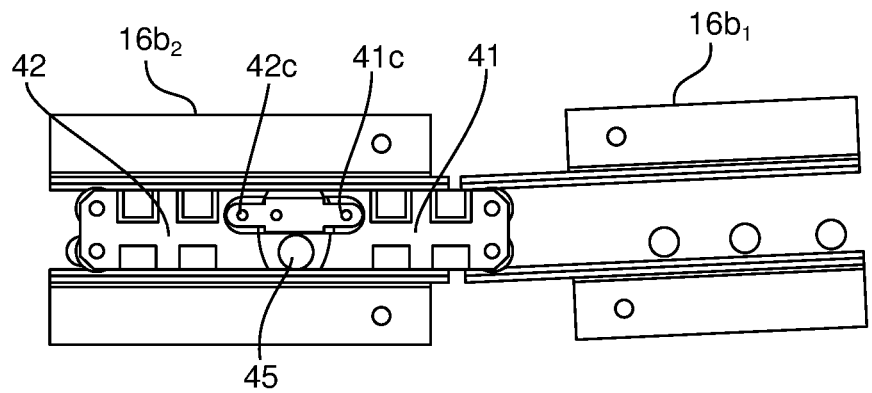

FIGS. 9a to 9f show two rails 16b1, 16b2, hereafter called the upstream rail 16b1 and the downstream rail 16b2. Said rails are oriented differently from each other so as to be able to adapt to the change in the conic angle of the cabin. In FIG. 9a, the assemblies 41, 42 are both housed in a sliding manner in the downstream rail 16b2. Only the end part of the upstream assembly 41 is engaged in the upstream rail 16b1.

Figure 9B:
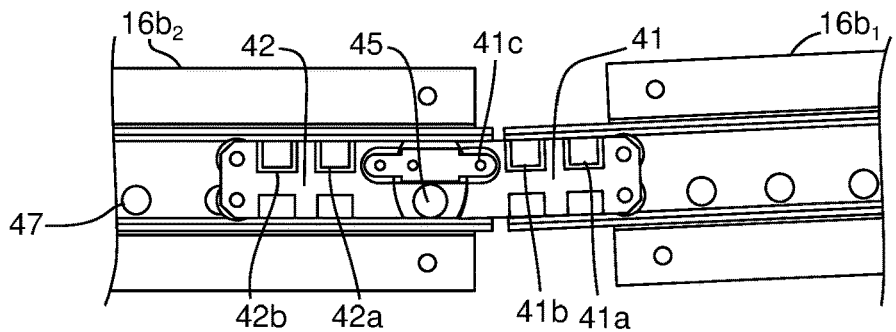

In FIG. 9b, the upstream assembly 41 is engaged to a large extent in the upstream rail 16b1. The upstream assembly 41 has therefore pivoted about its pin 41c. Moreover, the upstream 41 and downstream 42 assemblies are off-centre from each other and each follow the direction of the rail in which they are sliding.

Figure 9C:
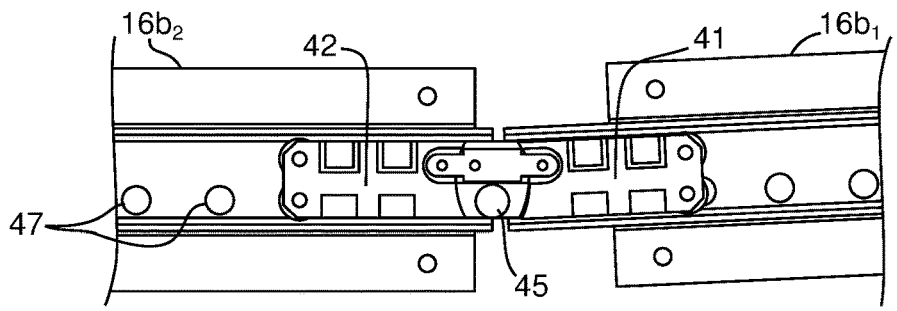

In FIG. 9c, the upstream assembly 41 is fully housed in the upstream rail 16b1.

Figure 9D:
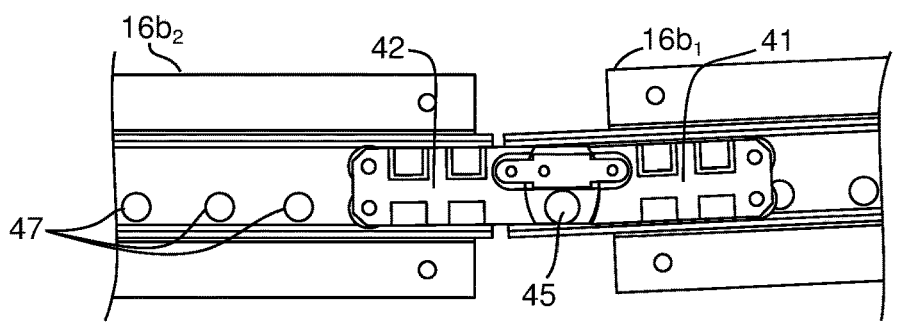

In FIG. 9d, the downstream assembly 42 is engaged in the upstream rail 16b1. Moreover, it pivots about its pin 42c so as to be capable of being brought into alignment with the direction of the upstream rail 16b1.

Figure 9E:
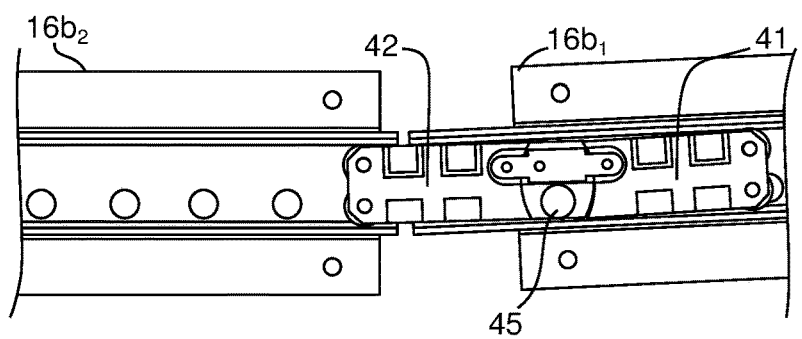

In FIG. 9e, the downstream rail 42 is engaged to a large extent in the upstream rail 16b1.

Figure 9F:
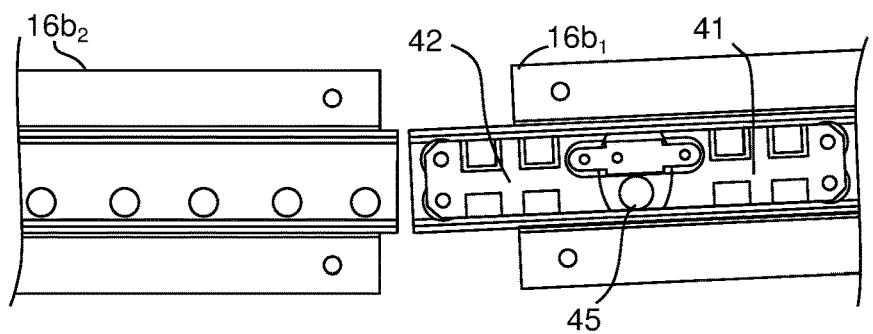

In FIG. 9f, the downstream rail 42 is fully engaged in the upstream rail 16b1, and both assemblies are again each housed in the same guide rail and therefore again have the same orientation.

Each guide block further comprises a locking pin 45 controlled by a locking handle 46 between a locked position in which it protrudes from the guide block so as to be housed in at least one locking insert 47 formed in the guide rail, and an unlocked position in which it is retracted into said guide block and released from said locking insert 47. In practice and as shown in FIGS. 9a to 9b, each rail comprises a plurality of locking inserts 47 evenly distributed along the rail in order to delimit a plurality of locked positions.

The invention claimed is:

1. A mobile class divider configured to transversely partition the interior space of a cabin of an aircraft, the interior space extending in a longitudinal direction and being delimited by ceiling trim panel, at least two lateral rows of overhead luggage compartments extending longitudinally near to said ceiling trim panels, lateral walls and a floor, said divider being mountable to slide along guide rails supported by said overhead luggage compartments, said divider comprising:
   a transverse main framework extending, once the mobile class divider has been mounted inside the cabin, between the lateral walls of said cabin beneath said overhead luggage compartments and said ceiling trim panels,
   at least two guide blocks supported by said framework, each guide block supporting sliding runners shaped to fit the guide rails so that, once the mobile class divider has been mounted inside said cabin, said divider is slidable along the guide rails of said cabin,
   wherein said main framework comprises an adjustment feature configured to adjust the length of the framework to adapt the length of said divider to the distance, in the transverse direction, that separates said guide rails of said cabin, said adjustment feature comprising at least one connecting shell and at least two lateral wings, each of which is secured to a guide block, each of said wings being slidably mounted in said connecting shell to slide spontaneously and synchronously in relation to each other in the transverse direction such that the overall length of said main framework is adaptable to the distance, in the transverse direction, that separates said guide rails, the connecting shell and said lateral wings forming said adjustment feature,
   and wherein said shell comprises a pinion and each lateral wing comprises a rack in contact with said pinion, said racks being arranged such that they are facing each other and are diametrically opposed relative to the pinion.

2. The divider according to claim 1, wherein said connecting shell is the central part of said main framework and extends in the vicinity of said ceiling trim panels of said cabin, once the mobile class divider has been mounted inside said cabin.

3. The divider according to claim 2, wherein said connecting shell bears a sign signaling an emergency exit of the cabin.

4. The divider according to claim 1, wherein for each guide block, the sliding runners mounted to pivot relative to said main framework in order to be oriented in the direction of the rails, during the displacement of the divider in the longitudinal direction.

5. The divider according to claim 4, wherein said runners comprise an upstream assembly and a downstream assembly, each of which is mounted to pivot relative to said main framework such that the upstream and downstream assemblies can be off-center from each other in order to cover areas in which the direction of the guide rails changes.

6. The divider according to claim 1, wherein at least one guide block comprises at least one locking pin controlled by a locking handle between a locked position in which the locking pin protrudes from the guide block so as to be housed in a locking insert formed in the guide rail opposite said guide block, and an unlocked position in which the locking pin is retracted into said guide block and released from said locking insert in order to allow the displacement of the divider along the guide rails.

7. The divider according to claim 1, wherein the connecting shell is distinct from the first and second guide blocks.

8. The divider according to claim 1, wherein the transverse main framework has a longitudinal axis of symmetry and the connecting shell is centered about said longitudinal axis of symmetry.

9. A mobile class divider configured to transversely partition the interior space of a cabin of an aircraft, the interior space extending in a longitudinal direction and being delimited by ceiling trim panel, at least two lateral rows of overhead luggage compartments extending longitudinally near to said ceiling trim panels, lateral walls and a floor, said divider being mountable to slide along guide rails supported by said overhead luggage compartments, said divider comprising:
   a transverse main framework extending, once the mobile class divider has been mounted inside the cabin, between the lateral walls of said cabin beneath said overhead luggage compartments and said ceiling trim panels,
   at least a first guide block and a second guide block supported by said framework, each first and second guide blocks supporting sliding runners shaped to fit the guide rails so that, once the mobile class divider has been mounted inside said cabin, said divider is slidable along the guide rails of said cabin,
   wherein said main framework comprises an adjustment feature configured to adjust the length of the framework to adapt the length of said divider to the distance, in the transverse direction, that separates said guide rails of said cabin,
   wherein said adjustment feature comprising a connecting shell and first and second lateral wings, said shell comprising a pinion and each lateral wing comprises a rack in contact with said pinion, said racks being arranged such that they are facing each other and are diametrically opposed relative to the pinion each of said wings being slidably mounted in said connecting shell to slide spontaneously and synchronously in relation to each other,
   wherein each first guide block and second guide block being arranged to slide with regard to connecting shell and to move away or to move closer from each other.

10. The divider according to claim 1, wherein the transverse main framework has a longitudinal axis of symmetry and the connecting shell is centered about said longitudinal axis of symmetry.

11. The divider according to claim 10, wherein the first lateral wing is secured to the first guide block and the second lateral wing is secured to the second guide block, the connecting shell covering and surrounding said first and second lateral wings.

* * * * *